United States Patent [19]
Nagler

[11] 4,286,844
[45] Sep. 1, 1981

[54] ULTRAWIDE ANGLE FLAT FIELD EYEPIECE

[76] Inventor: Albert Nagler, 15 Green Hill La., Spring Valley, N.Y. 10977

[21] Appl. No.: 91,972

[22] Filed: Nov. 7, 1979

[51] Int. Cl.$^3$ .............................. G02B 25/00
[52] U.S. Cl. .................................... 350/410
[58] Field of Search .............. 350/175 E, 224, 410, 350/473

[56] References Cited
U.S. PATENT DOCUMENTS

| | | |
|---|---|---|
| 3,586,418 | 6/1971 | Abe ........................ 350/175 E X |
| 3,807,835 | 4/1974 | Sussman .................. 350/175 E X |
| 3,867,018 | 2/1975 | Shoemaker .............. 350/175 E X |

Primary Examiner—John K. Corbin
Assistant Examiner—Scott J. Sugarman
Attorney, Agent, or Firm—William P. Keegan

[57] ABSTRACT

A wide angle eyepiece having a 90° field of view, a field curvature of at least 15.06 F, and minimal astigmatism.

2 Claims, 2 Drawing Figures

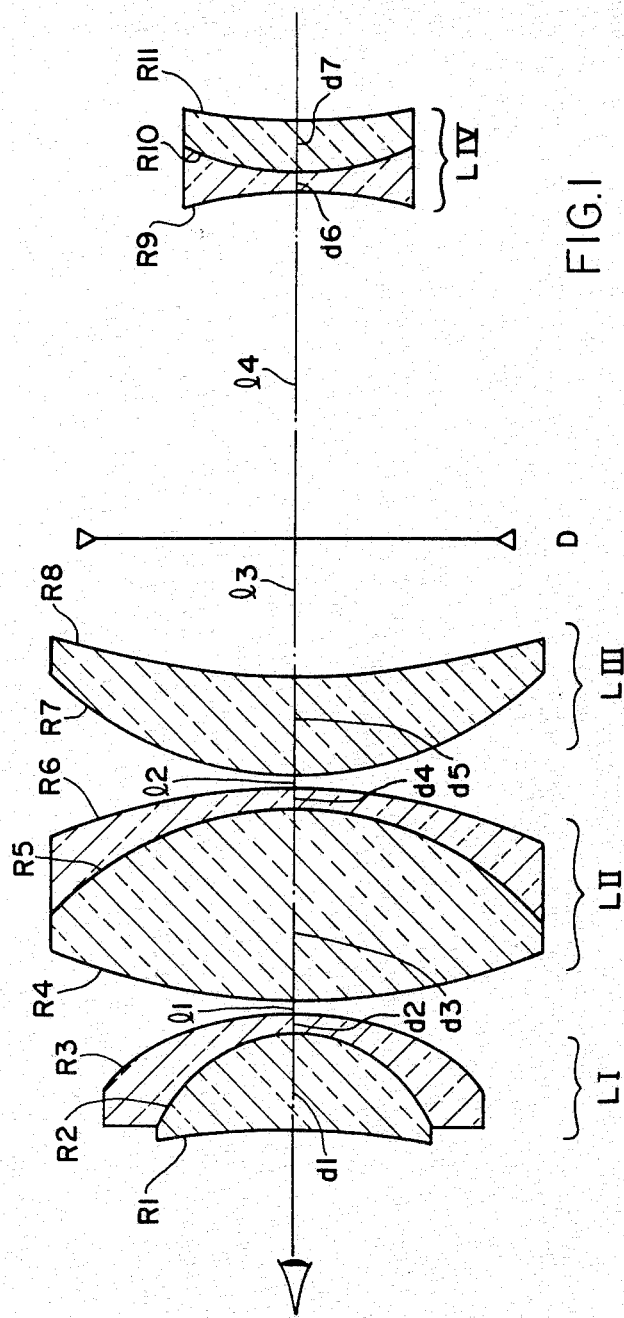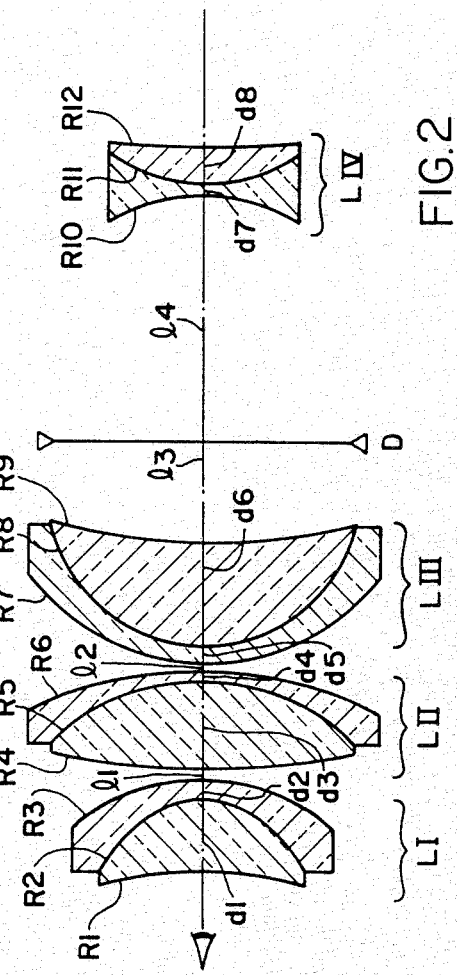

ULTRAWIDE ANGLE FLAT FIELD EYEPIECE

The invention relates to eyepieces suited especially for astronomical telescopes, and more particularly to eyepieces having a wide field of view with minimal aberrations of field curvature and astigmatism.

In general, it is known that wide angle eyepieces are limited by astigmatism and field curvature when the field of view exceeds 50°. For example, in the prior art, U.S. Pat. No. 3,384,434 discloses an eyepiece having a Petzval radius of 2.243F and an apparent field coverage of 72°, although the lens parameters actually specified were based on a 64° apparent field. In U.S. Pat. No. 3,464,764 the eyepiece disclosed has a Petzval radius of 6.067F and an apparent field of 64°.

Accordingly, it is the object of the present invention to provide an eyepiece having a field of view of 90° or more wherein curvature of field, astigmatism, spherical aberration, and longitudinal and lateral color are minimized.

It is a further object of the invention to provide an ultrawide angle eyepiece which has uniform sharpness over the entire field of view for relative apertures as fast as f/4.

It is still another object of the invention to provide an eyepiece having a field of view of 90° with eye relief equal to or greater than the eyepiece focal length.

Features and advantages of the invention may be gained from the foregoing and from the following specification of preferred embodiments of the invention.

In the drawing:

FIG. 1 is a schematic longitudinal sectional view showing one arrangement of lens elements according to the present invention.

FIG. 2 is a schematic longitudinal sectional view showing another embodiment of an eyepiece according to the present invention; and In FIG. 1 of the drawing, looking from left to right or from the viewer to the field lens, lens LI is a meniscus doublet having its surface of greatest curvature adjacent bi-convex doublet lens LII. Lens LIII, a single meniscus, also has its surface of greatest curvature adjacent lens LII. Lens LIV is a bi-concave doublet with a negative focal length and it is located ahead of the eyepiece focal plane. It is known that lenses such as lens LIV, i.e., a Barlow lens, can shorten the effective focal length of the eyepiece while maintaining an acceptable eye relief. Lens LIV has a negative focal length two to three times the eyepiece focal length. In FIG. 2, the general configuration of the eyepiece lenses is the same as in FIG. 1 except that lens LIII is a meniscus doublet.

The focal lengths of the individual eyepiece lenses are as follows: the focal length of lens LI is between six and twelve times the total eyepiece focal length; the focal length of lens LII is between three and six times the eyepiece focal length; and lens LIII has a focal length between six and eight times the eyepiece focal length. In addition, the sum of the powers of lenses LI and LIII should be between 0.2 and 0.4 of the total eyepiece power and between 1.0 and 1.5 times the power of lens LII. Also, the focal length of lenses LI, LII, and LIII, as a group, is between 1.5 and 2.5 times the total eyepiece focal length.

The eyepiece has an internal focal plane D that lies approximately one third of the distance from lens LIII to lens LIV.

More specifically, the lens data for a FIG. 1 embodiment eyepiece with a 10 mm. focal length and a field of view of 90° is shown in Table I wherein lens curvatures, lens thicknesses, and lens separation distances are given in millimeters, n is the refractive index of a lens element, and v is the Abbe number for a lens element.

TABLE I

| Lens | Radii | Axial Thickness "d" | Lens Separation "l" | n | v |
|---|---|---|---|---|---|
| LI | R1 = −75.6 | d1 = 8.4 | | n1 = 1.620 | v1 = 60.3 |
| | R2 = −12.7 | d2 = 1.5 | | n2 = 1.717 | v2 = 29.5 |
| | R3 = −25.2 | | | | |
| | | | l1 = 0.5 | | |
| LII | R4 = +52.9 | d3 = 16.8 | | n3 = 1.620 | v3 = 60.3 |
| | R5 = −25.2 | d4 = 1.5 | | n4 = 1.717 | v4 = 29.5 |
| | R6 = −52.9 | | | | |
| | | | l2 = 0.5 | | |
| LIII | R7 = +29.9 | d5 = 8.4 | | n5 = 1.620 | v5 = 60.3 |
| | R8 = +75.6 | | | | |
| | | | l3 = 10.9 | | |
| D | | | | | |
| | | | l4 = 29.6 | | |
| LIV | R9 = −23.5 | d6 = 1.5 | | n6 = 1.620 | v6 = 60.3 |
| | R10 = +14.0 | d7 = 3.8 | | n7 = 1.717 | v7 = 29.5 |
| | R11 = +37.6 | | | | |

An eyepiece having the lens data set forth in Table I has a Petzval radius of 18.83F and, significantly, an actual field that is flat within 0.02F over its entire area. Moreover, such an eyepiece shows an astigmatic difference of 0.021F at a 70° field of view and 0.012F at a 90° field. If the eyepiece is dimensioned for greater edge thickness, the astigmatism can be reduced further, and in such an eyepiece the astigmatism has been reduced to 0.0F for a 100° field. Eye relief is approximately 1.4F.

The lens data for a FIG. 2 embodiment eyepiece with a 10 mm. focal length and a 90° field of view is shown in Table II. This eyepiece has an enhanced coma correction at the edge of the field. The lens parameters are defined the same as those in Table I.

TABLE II

| Lens | Radii | Axial Thickness "d" | Lens Separation "l" | n | v |
|---|---|---|---|---|---|
| LI | R1 = −45.7 | d1 = 7.6 | | n1 = 1.6204 | v1 = 60.3 |
| | R2 = −12.1 | d2 = 0.9 | | n2 = 1.7174 | v2 = 29.5 |
| | R3 = −23.7 | | | | |
| | | | l1 = 0.4 | | |
| LII | R4 = +64.6 | d3 = 10.1 | | n3 = 1.6204 | v3 = 60.3 |
| | R5 = −24.9 | | | | |

TABLE II-continued

| Lens | Radii | Axial Thickness "d" | Lens Separation "l" | n | v |
|---|---|---|---|---|---|
|  |  | d4 = 0.9 |  | n4 = 1.7174 | v4 = 29.5 |
|  | R6 = −43.4 |  | l2 = 0.4 |  |  |
| LIII | R7 = +26.1 | d5 = 0.9 |  | n5 = 1.7174 | v5 = 29.5 |
|  | R8 = +19.0 | d6 = 10.9 |  | n6 = 1.6204 | v6 = 60.3 |
|  | R9 = +82.3 |  |  |  |  |
|  | D |  | l3 = 10.8 |  |  |
|  |  |  | l4 = 26.9 |  |  |
| LIV | R10 = −20.8 | d7 = 0.9 |  | n7 = 1.6204 | v7 = 60.3 |
|  | R11 = +16.4 | d8 = 3.0 |  | n8 = 1.6727 | v8 = 32.2 |
|  | R12 = +65.2 |  |  |  |  |

The FIG. 2 eyepiece with lens data according to Table II has a Petzval radius of 15.06F. The astigmatic difference for that eyepiece is 0.017F and for a 70° field of view and 0.019F for a 30° field. Eye relief is approximately 1.4F.

The thickness of all lens elements should be kept to a minimum, but at the same time the edge thicknesses should be sufficient to permit clear apertures large enough for the edge field chief ray. Also, it should be noted that the various lens elements are made from common, ordinary optical glass, and that the eyepiece characteristics achieved do not require costly, special, or unusual glasses.

Having thus described the invention, it is to be understood that the specification and drawing are to be interpreted as illustrative and not in a limiting sense.

What is claimed is:

1. A wide angle eyepiece comprising four lenses, I, II, III, and IV, and a field stop D located between lens III and lens IV, wherein lens II is a bi-convex lens, lenses I and III are meniscus lenses with the strongest curve of each adjacent lens II, and lens IV is a bi-concave lens, said lenses having parameters substantially as set forth in the following table wherein lens curvatures, lens thicknesses, and lens separation distances are given in millimeters, n is the refractive index of a lens element, and v is the Abbe number for a lens element:

| Lens | Radii | Axial Thickness "d" | Lens Separation "l" | n | v |
|---|---|---|---|---|---|
|  | R1 = −75.6 |  |  |  |  |

| Lens | Radii | Axial Thickness "d" | Lens Separation "l" | n | v |
|---|---|---|---|---|---|
| LI | R2 = −12.7 | d1 = 8.4 |  | n1 = 1.620 | v1 = 60.3 |
|  |  | d2 = 1.5 |  | n2 = 1.717 | v1 = 29.5 |
|  | R3 = −25.2 |  | l1 = 0.5 |  |  |
| LII | R4 = +52.9 | d3 = 16.8 |  | n3 = 1.620 | v3 = 60.3 |
|  | R5 = −25.2 | d4 = 1.5 |  | n4 = 1.717 | v4 = 29.5 |
|  | R6 = −52.9 |  | l2 = 0.5 |  |  |
| LIII | R7 = +29.9 | d5 = 8.4 |  | n5 = 1.620 | v5 = 60.3 |
|  | R8 = +75.6 |  |  |  |  |
|  | D |  | l3 = 10.9 |  |  |
|  |  |  | l4 = 29.6 |  |  |
| LIV | R9 = −23.5 | d6 = 1.5 |  | n6 = 1.620 | v6 = 60.3 |
|  | R10 = +14.0 | d7 = 3.8 |  | n7 = 1.717 | v7 = 29.5 |
|  | R11 = +37.6 |  |  |  |  |

2. A wide angle eyepiece comprising four lenses, I, II, III, and IV, and a field stop D located between lens III and lens IV, wherein lens II is a bi-convex lens, lenses I and III are meniscus lenses with the strongest curve of each adjacent lens II, and lens IV is a bi-concave lens, said lenses having parameters substantially as set forth in the following table wherein lens curvature, lens thicknesses, and lens separation distances are given in millimeters, n is the refractive index of a lens element, and v is the Abbe number for a lens element:

| Lens | Radii | Axial Thickness "d" | Lens Separation "l" | n | v |
|---|---|---|---|---|---|
| LI | R1 = −45.7 | d1 = 7.6 |  | n1 = 1.6204 | v1 = 60.3 |
|  | R2 = −12.1 | d2 = 0.9 |  | n2 = 1.7174 | v2 = 29.5 |
|  | R3 = −23.7 |  | l1 = 0.4 |  |  |
| LII | R4 = +64.6 | d3 = 10.1 |  | n3 = 1.6204 | v3 = 60.3 |
|  | R5 = −24.9 | d4 = 0.9 |  | n4 = 1.7174 | v4 = 29.5 |
|  | R6 = −43.4 |  | l2 = 0.4 |  |  |

-continued

| Lens | Radii | Axial Thickness "d" | Lens Separation "l" | n | v |
|---|---|---|---|---|---|
| LIII | R7 = +26.1 | | | | |
| | | d5 = 0.9 | | n5 = 1.7174 | v5 = 29.5 |
| | R8 = +19.0 | | | | |
| | | d6 = 10.9 | | n6 = 1.6204 | v6 = 60.3 |
| | R9 = +82.3 | | | | |
| | | | l3 = 10.8 | | |
| | D | | | | |
| | | | l4 = 26.9 | | |
| LIV | R10 = −20.8 | | | | |
| | | d7 = 0.9 | | n7 = 1.6204 | v7 = 60.3 |
| | R11 = +16.4 | | | | |
| | | d8 = 3.0 | | n8 = 1.6727 | v8 = 32.2 |
| | R12 = +65.2 | | | | |

\* \* \* \* \*